United States Patent [19]

Mowery

[11] 4,329,970
[45] May 18, 1982

[54] ENGINE SPARK TIMING CONTROL WITH ADDED RETARD AND RF SIGNAL PROTECTION

[75] Inventor: Kenneth D. Mowery, Kokomo, Ind.

[73] Assignee: General Motors Corporation, Detroit, Mich.

[21] Appl. No.: 146,390

[22] Filed: May 5, 1980

[51] Int. Cl.³ .............................. F02P 5/04; F02P 9/00
[52] U.S. Cl. .................................... 123/618; 123/633; 123/425
[58] Field of Search ............... 123/425, 618, 633, 427; 315/209 T

[56] References Cited

U.S. PATENT DOCUMENTS

| | | | |
|---|---|---|---|
| 3,991,730 | 11/1976 | Crall | 123/618 |
| 3,991,733 | 11/1976 | Harris | 123/618 |
| 4,106,447 | 8/1978 | West | 123/427 |
| 4,202,304 | 5/1980 | Jundt et al. | 123/618 |
| 4,249,506 | 2/1981 | Tada | 123/618 |
| 4,253,442 | 3/1981 | Jundt et al. | 123/618 |

FOREIGN PATENT DOCUMENTS 2847290 5/1980 Fed. Rep. of Germany ...... 123/618

*Primary Examiner*—P. S. Lall
*Attorney, Agent, or Firm*—Robert M. Sigler

[57] ABSTRACT

A spark ignited internal combustion engine includes a spark coil in which current is turned on and off to generate spark events. A triangular wave voltage generator and comparator combine to retard the spark events from spark timing signals, the voltage ramping in one direction toward a reference in response to a spark timing signal and ramping in the other direction when the comparator senses that the voltage equals the reference, at which time a spark event is initiated. An RF clamp clamps the input to the comparator to prevent initiation of a spark event from each spark event to the following spark timing event. A minimum burn timer may be initiated by the comparator to prevent current flow in the spark coil for a minimum predetermined time after the initiation of a spark event; and the RF clamp may include a timer to delay its initiation sufficiently to allow latching of the minimum burn timer.

2 Claims, 4 Drawing Figures

ENGINE SPARK TIMING CONTROL WITH ADDED RETARD AND RF SIGNAL PROTECTION

BACKGROUND OF THE INVENTION

This invention relates to spark timing controls for spark ignited, internal combustion engines and particularly to the type of control which generates normal spark timing pulses in response to one or more engine operating variables and further includes electronic apparatus capable of retarding the actual spark times from said normal pulses in response to another engine operating variable such as engine knock. An example of such a control is shown in U.S. Pat. No. 4,106,447 issued to Gene A. West on Aug. 15, 1978. The system described therein has demonstrated significant commercial success over the past several years in controlling spark timing to limit engine knock intensity in turbocharged and naturally aspirated, high compression engines mounted in mass produced vehicles.

This system is used with means for detecting the intensity of engine knock and generating a signal therefrom which specifies a desired degree of spark retard from the normal spark timing of the engine. This system includes apparatus effective to retard the spark pulses of the engine from the normal spark timing by a crank angle determined by the aforementioned signal. This system further includes minimum burn timer means to ensure, after each spark event, that the current remains cut off in the spark coil for a predetermined minimum time to ensure good combustion, even during high engine speed, maximum retard operation wherein the system might otherwise attempt to turn current back on in the spark coil before the greatly retarded previous spark event is finished.

The apparatus includes integrating means which integrates at a slower rate in one direction during most of the time between successive spark pulses but changes direction at the normal spark timing and integrates at a much faster rate back to a reference level, the crossing of the reference level triggering the actual spark pulse and once more changing the direction of integration. This apparatus provides a controlled crank angle of additional spark retard regardless of changing engine speeds, since the fast integration in the one direction is at a constant rate but the slower integration in the other direction is at a rate which varies with the amount of retard desired. Variations in engine speed affect the integration in each direction similarly so that the crank angle of additional retard is not undesirably affected by such variations.

However, most electronic circuitry is susceptible to stray radio frequency electromagnetic signals which have become increasingly common in recent years. It is therefore desirable to protect an electronic circuit to a reasonable degree against malfunction due to the possible receipt of such stray radio frequency (RF) signals.

SUMMARY OF THE INVENTION

It is therefore an object of this invention to provide a vehicle mounted, spark ignited, internal combustion engine including apparatus effective to control engine knock in response to an engine knock signal by varying engine spark timing, the apparatus being protected against malfunction due to stray radio frequency electromagnetic signals.

It is another object of this invention to provide such apparatus including functioning minimum burn timer apparatus.

This and other objects are obtained, in the system described above, by the addition of a clamping circuit to the output of the previously described integrating means, which circuit prevents the integrator output from reaching the reference level during the long, slow integration in the one direction. The clamp circuit suppresses any RF induced spike in the integrator output during the time between each spark event and the following normal spark time, when no spark pulse is desired. In addition, a small time delay is provided in the activation of the clamp by a spark event to allow the minimum burn timer to latch on.

Further details and advantages of this invention will be apparent from the accompanying drawings and following description of the preferred embodiment.

DESCRIPTION OF THE PREFERRED EMBODIMENT

Figure 1:
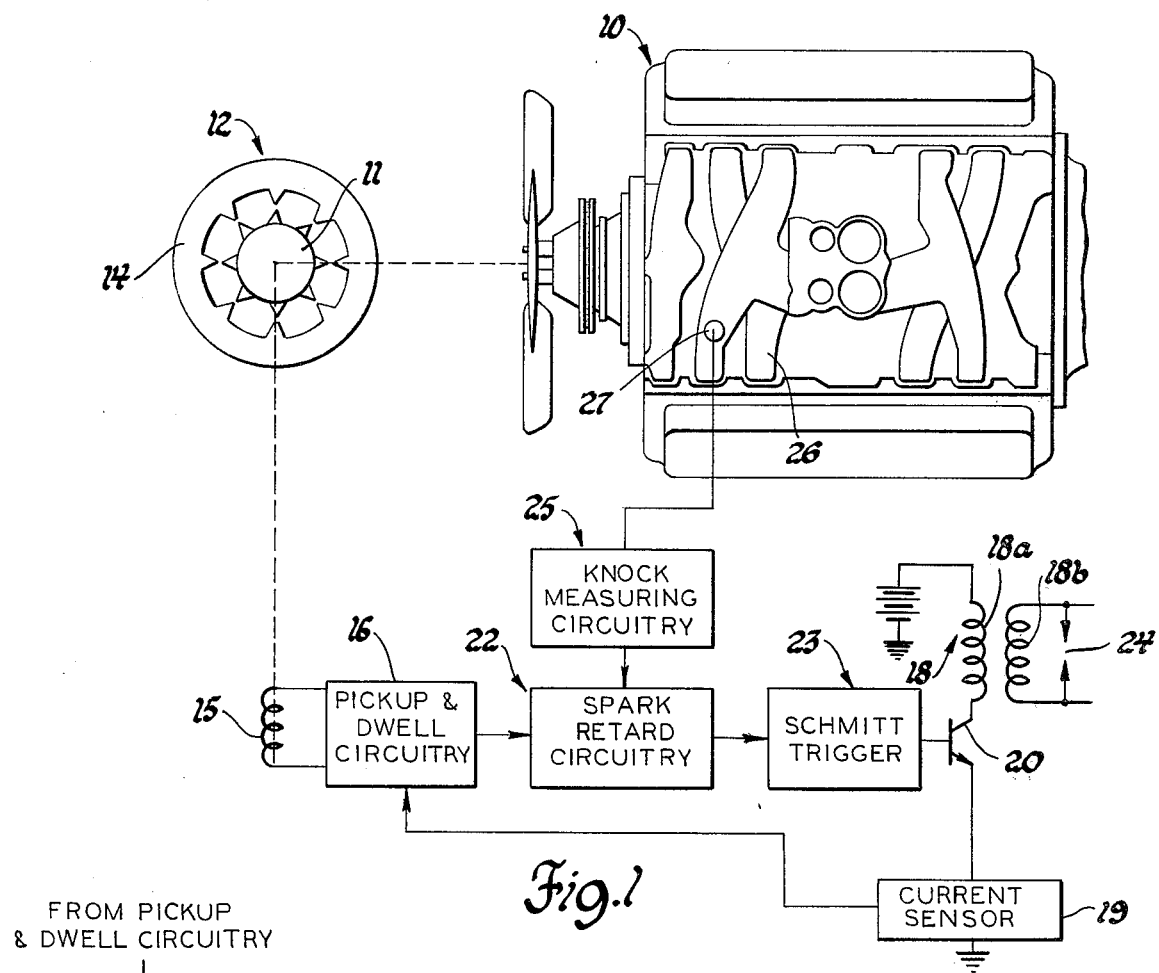
FIG. 1 is a schematic and block diagram of an internal combustion engine according to this invention.

Referring to FIG. 1, an internal combustion engine 10 has a rotating crankshaft which drives the rotor 11 of an alternating current signal generator 12. Generator 12 is a standard spark timing signal generator of the variable reluctance type disclosed and described in U.S. Pat. No. 3,254,247 to Falgy, which issued May 31, 1966. Generator 12 also includes a stator 14 and pickup coil 15 and provides a plurality of equally spaced projections around rotor 11 and stator 14 related to the number of cylinders in engine 10. Relative rotation between the rotor 11 and stator 14 at a speed proportional to engine speed produces a pulsating variation in reluctance which induces an alternating voltage signal in coil 15.

The alternating voltage signal in coil 15 is applied to pickup and dwell circuitry 16, which generates normal spark timing pulses. These normal spark timing pulses could be applied to a Schmitt trigger 23 to control a switching transistor 20 connected to switch current on and off in the primary 18a of a spark coil 18. The flow of current in primary 18a causes electromagnetic energy to build up in spark coil 18; and this energy is released, when transistor 20 cuts off current in primary 18a, in the form of a high voltage spark pulse in coil secondary 18b applied to spark plug 24. A current sensor 19 provides feedback to pickup and dwell circuitry 16 to control the dwell time of current conduction in primary 18a. The system so far described is one well known in the art and shown in the U.S. Pat. to Richards et al No. 3,828,672, issued Oct. 1, 1974.

In order to selectively retard the spark timing in response to an engine knock signal, spark retard circuitry 22 is inserted between pickup and dwell circuitry 16 and Schmitt trigger 23. Prior art apparatus designed for use as spark retard circuitry is shown in U.S. Pat. No. 4,106,447, issued to Gene A. West Aug. 15, 1978.

This invention comprises a modification of that apparatus as described at a later point in this specification.

Engine 10 is provided with an intake manifold 26 on which may be mounted, in a position determined by experiment for a particular engine but including the position shown in FIG. 1, a vibration or detonation sensor 27, which may be threaded into a suitably threaded depression in a mounting boss provided in manifold 26. Vibration sensor 27 vibrates physically with intake manifold 26 and responds to such vibrations to generate an electrical output voltage corresponding to such vibrations. Sensor 27 can also be mounted on the block or another component of engine 10. Sensor 27 may be of the type which includes a permanent magnet to generate magnetic flux, an electric pickup coil and a magnetostrictive element within the coil in the path of the magnetic flux to vary the flux with vibration and thus generate the output voltage across the coil. An example of such a vibration sensor is the U.S. Pat. No. 4,161,665 issued to Charles E. Buck et al on July 17, 1979. However, some other sensors of the piezoelectric type or other types may also be suitable.

The output signal from sensor 27 is provided to knock measuring circuitry 25 in which a knock intensity signal is generated for application to spark retard circuitry 22 to control the retard of the sparks in spark plug 24 from the normal spark timing. Apparatus suitable for use as knock measuring circuitry 25 is shown in U.S. Pat. No. 4,111,035, issued to Gene A. West et al on Sept. 5, 1978.

Figure 2:
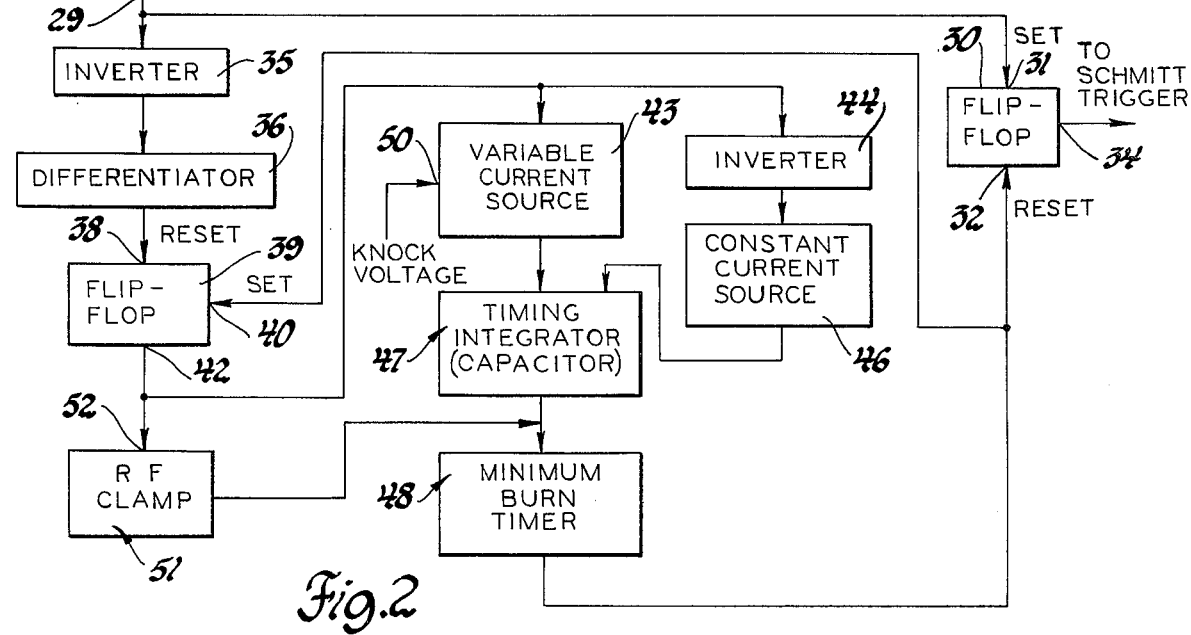
FIG. 2 is a block diagram of spark retard circuitry suitable for use in the engine of FIG. 1.

Spark retard circuitry 22 is shown in block diagram form in FIG. 2. A squaring amplifier 28 receives the output of the pickup and dwell circuitry 16, compares it to the same reference as Schmitt trigger 23 and squares the waveform into a square wave of alternating high, coil-on signals and low, coil-off or spark timing signals. A flip-flop 30 has a set input 31 connected to the output 29 of squaring amp 28, a reset input 32 and an output 34. Flip-flop 30 is a bistable circuit which normally assumes a first state having a high output on output 34 when a high input is received on set input 31 and a second stable state with a low output on output 34 when a high input is received on reset input 32. Flip-flop 30 is constructed in such a way that reset input 32 dominates set input 31: that is, if high inputs are received simultaneously on the set and reset inputs, the second state is assumed and a low output is produced on output 34.

The output 29 of squaring amp 28 is also connected through an inverter 35 and differentiator 36 to the reset input 38 of a flip-flop 39. Flip-flop 39 has a set input 40 and further has an output 42 connected to control a variable discharge current source 43 and, through an inverter 44, a constant charge current source 46.

Variable discharge current source 43 and constant charge current source 46 are connected to alternately control current flow to a timing integrator 47, which is in turn connected through a minimum burn timer 48 to reset input 32 of flip-flop 30 and set input 40 of flip-flop 39.

The operation of the system of FIGS. 1 and 2 will now be briefly described. As the crank-shaft of engine 10 rotates, the pickup and dwell circuitry 16 has an output which is shifted up or down with respect to a constant reference voltage by the feedback loop including current sensor 19 and is shifted in phase with respect to a constant reference crankshaft angle of rotation by standard centrifugal and vacuum advance means, not shown, to produce a normal spark timing. The reference voltage with respect to which the output is shifted up or down would ordinarily be, in the absence of spark retard circuitry 22, the switching voltage of Schmitt trigger 23. This switching voltage is duplicated in the switching voltage of squaring amp 28 in the spark retard circuitry 22, squaring amp 28 thus simulating Schmitt trigger 23 from the point of view of pickup and dwell circuitry 16.

The output of squaring amp 28 comprises a square wave having alternate high, coil on signals and low, spark timing signals. When the output 29 of squaring amp 28 goes high, the set input to flip-flop 30 normally causes the output 34 of flip-flop 30 to go high at the same time. The output of inverter 35 is caused to pulse downward in response to the up pulse from squaring amp 28; however, any negative spike or pulse which would be generated in differentiator 36 is suppressed and has no effect on flip-flop 39. Assuming that the output of flip-flop 39 is high at this point, variable discharge current source 43 has been allowing timing integrator 47 to ramp downward.

A normal spark timing signal or down pulse has no direct effect on flip-flop 30 through set input 31; but, through inverter 35 and differentiator 36, it provides a positive spike or pulse to reset input 38 of flip-flop 39. The output of flip-flop 39 at this moment pulses downward to turn off the variable discharge current source 43 and, through inverter 44, to turn on constant charge current source 46. Timing integrator 47 begins integrating upward at a constant rate until it reaches a reference voltage. At this point it caused minimum burn timer 48 to produce a positive pulse of predetermined width such as 250 microseconds. The leading or upward edge of this positive pulse causes flip-flop 30 to switch to its second stable state and thus provide a trigger signal to Schmitt trigger 23 and transistor 20 to shut off current in spark coil primary 18a and cause the firing of a spark plug. It also causes flip-flop 39 to switch to its first stable state, which turns off constant charge current source 46, turns on variable discharge current source 43 and starts timing integrator 47 ramping downward once again.

Integrator 47 is thus seen to generate a triangular wave voltage which turns upward with each spark timing signal and downward with each trigger signal. The amount of retard provided by spark retard circuitry 22 is directly a result of the time required by timing integrator 47 to integrate upward to the reference level at a constant integration rate. This is, in turn, determined by both the amount of time spent by the timing integrator in integrating downward from the reference level and the particular rate of downward integration. The use of downward and upward integration in a triangular wave removes vehicle or engine speed as a factor and makes the amount of retard a function in degrees of crankshaft rotation of the downward integration rate or, in other words, of the discharge current. The variable discharge current source 43 has an input 50 which receives a signal in the form of a DC voltage level from vehicle knock sensing means such as that shown in the aforementioned West et al U.S. Pat. No. 4,111,035.

Thus the systems of FIGS. 1 and 2 will produce a retard with respect to the normal spark timing produced by crankshaft position, vacuum and centrifugal advance, which retard is determined by the output of knock measuring circuitry applied to input 50 of variable discharge current source 43. The dwell determining circuitry comprising current sensor 19 and pickup and dwell circuitry 16 will respond automatically to correct the dwell or coil-on time whenever changes in the measured knock or other engine operating condition cause a change in the additional retard. The minimum burn timer, as described in the aforementioned West U.S. Pat. No. 4,106,447, ensures a minimum spark burn time, even under conditions of maximum knock retard at high speed, by preventing flip-flop 30 from being set during its activation.

It can be seen that the actual time of spark generation is determined by the integrator output rising to the reference level. However, if a strong RF signal were able to generate in the integrator output a voltage spike sufficient in amplitude to exceed the reference level, the system might attempt to generate a spark at a time in advance of the normally determined spark time. Therefore, this invention provides an RF clamp 51 effective to clamp the output of integrator 47 to a level below the reference level during a predetermined portion of each spark cycle to prevent the undesired initiation of a spark due to spurious RF signals.

RF clamp 51 includes an input 52 which receives the same signal from output 42 of flip-flop 39 that controls variable current source 43. RF clamp 51 is thereby activated concurrently with variable current source 43 (except for a short time delay to be described later) to prevent initiation of a spark firing event during the time between the actual firing of a spark and the normal time for the next spark. During this period, of course, downward integration is taking place within integrator 47; however, the output is clamped low. When flip-flop 39 is next reset, RF clamp 51 is deactivated so that the upward integration of integrator 47 can be seen. It will be noted that, during the upward integration of integrator 47, a spurious RF signal of sufficient magnitude might be able to generate a spark event. However, since this spark event would occur after the normal spark time, the worst effect of such an event would be the ignition of a cylinder with somewhat less than the additional retard called for by the knock control system with a possible temporary increase in audible knock.

Figure 3:
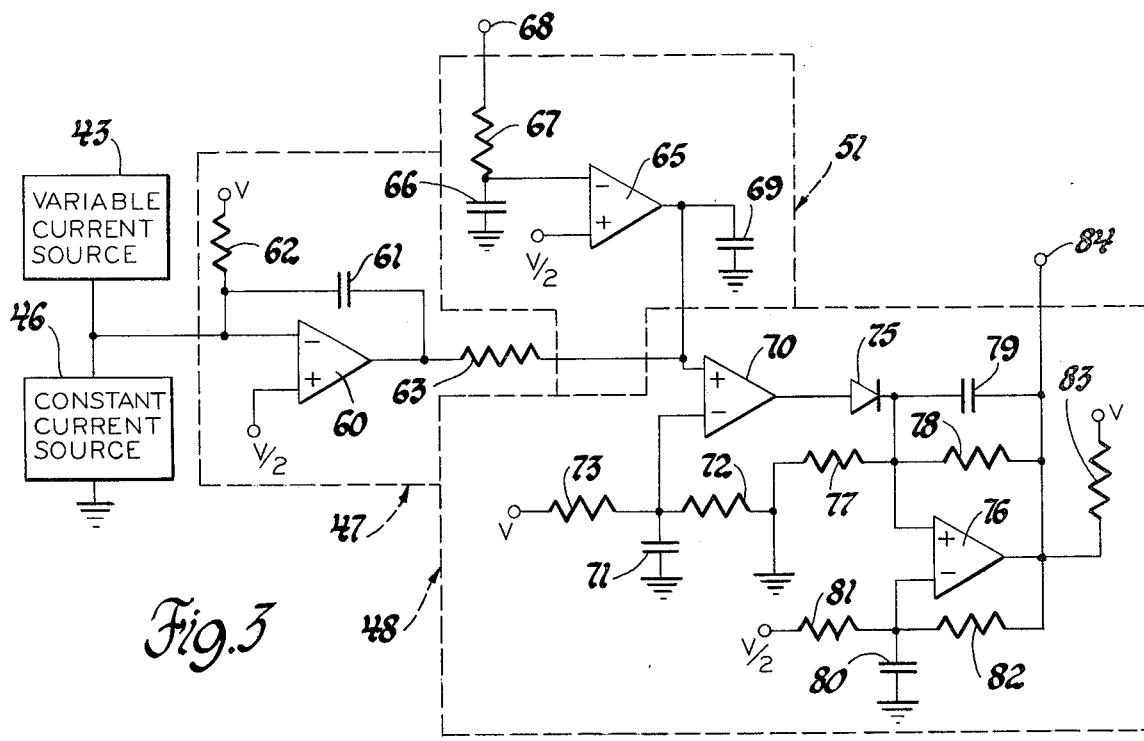
FIG. 3 is a circuit diagram of a portion of the spark retard circuitry shown in FIG. 2.
Figure 4:
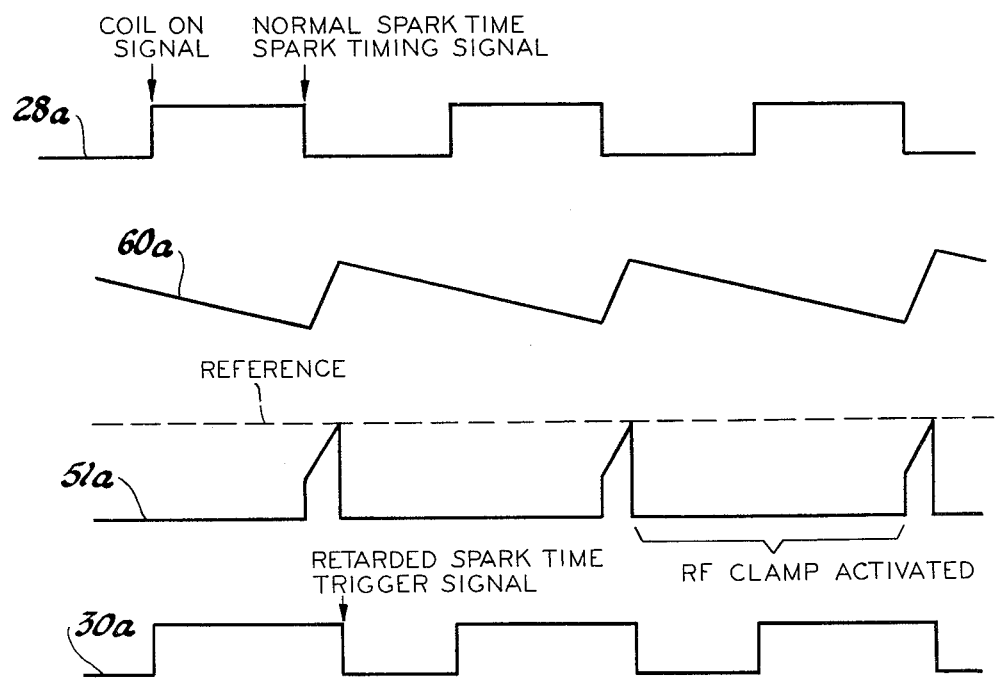
FIG. 4 shows a number of time waveforms useful in illustrating the operation of the spark retard circuitry of FIGS. 1-3.

Referring to FIGS. 3 and 4, the relevant portion of the apparatus of FIG. 2 is shown in greater detail. Timing integrator 47 comprises an op amp 60 having a noninverting input connected to an electrical power source at supply voltage V/2 and an inverting input connected to variable current source 43 and constant current source 46. Op amp 60 further has an output connected back through a capacitor 61 to the inverting input, which is in turn connected through a resistor 62 to the electrical power source at a supply voltage V. The output of op amp 60 is further connected to one end of a resistor 63. RF clamp 51 comprises a comparator 65 having a noninverting input connected to the electric power source at supply voltage V/2, an inverting input connected through a capacitor 66 to ground and through a resistor 67 to a control input 68 and an output connected through a capacitor 69 to ground and also to the other end of resistor 63.

Minimum burn timer 48 comprises a comparator 70 having a noninverting input connected to the other end of resistor 63 and an inverting input connected through a capacitor 71 to ground, through a resistor 72 to ground and through a resistor 73 to the electric power source at supply voltage V. Comparator 70 has an output connected to the anode of a diode 75, the cathode of which is connected to the noninverting input of a comparator 76. The cathode of diode 75 is further connected through a resistor 77 to ground and through a resistor 78 and capacitor 79 in parallel to the output of comparator 76. Comparator 76 has an inverting input connected through a capacitor 80 to ground, through a resistor 81 to the electric power source at supply voltage V/2 and through a resistor 82 to the output thereof. The output of comparator 76 is further connected through a resistor 83 to the electric power source at supply voltage V and directly to an output terminal 84.

In operation, squaring amp 28 of FIG. 2 generates an output as shown in waveform 28a of FIG. 4. With each downward transition in waveform 28a, a spark timing signal, flip-flop 39 is reset to deactivate variable current source 43, activate constant current source 46 and provide a low input signal to input terminal 68 of RF clamp 51. At this point, the output voltage of op amp 60 in timing integrator 47 is below the reference voltage established at the inverting input of comparator 70 by the voltage divider comprising resistors 72 and 73; and constant current source 46 causes current to flow from capacitor 61 to ground to cause the output voltage of op amp 60 to integrate upward. With a low voltage applied to the inverting input of comparator 65, clamp 51 is deactivated so that the rising voltage output of op amp 60 is applied through resistor 63 to the noninverting input of comparator 70.

When the rising voltage output of op amp 60 reaches the reference voltage level applied to the inverting input of comparator 70, the output of comparator 70 switches high. This output voltage is applied through diode 75 to the noninverting input of comparator 76, where it causes the output of comparator 76 to also switch high. The output of comparator 76 is provided from output terminal 84 to the reset input of flip-flop 30 to cause the initiation of a spark event and to the set input of flip-flop 39, where it deactivates constant current source 46, activates variable current source 43 and provides a high input to control input 68 of RF clamp 51. It is further provided back through capacitor 79 to the noninverting input of comparator 76 to latch on the minimum burn timer.

Variable current source 43 now causes current to flow to capacitor 61 in a direction to cause the output voltage of op amp 60 to ramp downward away from the reference level. An RC time delay circuit comprising resistor 67 and capacitor 66 causes a slight delay in the application of the high voltage to the inverting input of comparator 65 before comparator 65 clamps the noninverting input of comparator 70 low. This small time delay is made just long enough to allow the minimum burn timer to latch itself on through capacitor 79 before the high voltage is removed from the anode of diode 75. As soon as the voltage applied to the inverting input of comparator 65 exceeds voltage V/2, however, RF clamp 51 is activated as the output voltage of comparator 65 drops to a low level. The voltage at the inverting input of comparator 76 then rises upward until comparator 76 switches its output low to end the minimum burn time. The voltage applied to the noninverting input of comparator 70 is maintained at the low level during the downward integration of integrator 47, in spite of any spurious RF signals which might be present, until the next downward transition of the output of squaring amp 28, which causes a repeat of the cycle.

The operation as described above can be seen in the waveforms of FIG. 4. Waveform 60a represents the output of op amp 60, which turns upward at the spark timing signal, downward transition of waveform 28a.

At this same time, clamp 51 is deactivated; and the voltage at the noninverting input of comparator 70, as shown in waveform 51a, is allowed to follow the output of op amp 60. When the voltage illustrated in waveform 51a reaches the reference level, the retarded spark event is initiated with a trigger signal, as shown in waveform 30a, which represents the output of flip-flop 30. Simultaneously, the voltage of waveform 60a turns downward once again and, after a slight delay too small to be noticeable on the scale of FIG. 4, the voltage of waveform 51a is once again clamped to a low level.

The following are examples of component parts and values for this embodiment:

| Resistors | Capacitors |
|---|---|
| 62 - 3.9M | 61 - 0.1μF |
| 67 - 15K | 66 - 56pF |
| 72 - 33.2K, 1% | 69 - 270pF |
| 73 - 27.4K, 1% | 71 - 2.7μF |
| 77 - 130K, 1% | 79 - 10pF |
| 78,81,82 - 100K, 1% | 80 - 0.01μF |
| 83 - 10K | |
| Op Amp | Diode |
| 60 - LM-2902 | 75 - 1N485B |
| | Comparators |
| | 65,70,76 - LM-2901 |

The embodiments of the invention in which an exclusive property or privilege is claimed are defined as follows:

1. In combination:
   a spark ignited internal combustion engine including means effective to generate spark timing signals and means effective to generate spark events in response to trigger signals;
   means effective to generate a triangular wave voltage which initiates movement in one direction toward a reference voltage in response to each spark timing signal and initiates movement in the opposite direction in response to each trigger signal;
   comparator means having an input normally responsive to the triangular wave voltage, the comparator means being effective to generate a trigger signal when the voltage applied to the input equals the reference voltage;
   clamp means effective, when activated by each trigger signal, to clamp the input of the comparator means to a voltage effective to prevent generation of the trigger signal, the clamp means being deactivated by each spark timing signal, whereby a spark event is prevented from occurrence due to received RF signals during the period from each spark event until the next spark timing signal.

2. In combination:
   a spark ignited internal combustion engine including a spark coil, means to provide current through the spark coil to build energy therein in response to coil on signals, means to cut current off in the spark coil to cause a spark event in response to trigger signals and means to generate alternating coil on signals and spark timing signals;
   means effectve to generate a triangular wave voltage which initiates movement in one direction toward a reference voltage in response to each spark timing signal and initiates movement in the opposite direction in response to each trigger signal;
   comparator means having an input normally responsive to the triangular wave voltage, the comparator means being effective to generate a trigger signal when the voltage applied to the input equals the reference voltage;
   clamp means effective, in response to each trigger signal, to clamp the input of the comparator means to a voltage effective to prevent generation of the trigger signal, the clamp means being deactivated by each spark timing signal;
   minimum burn timer means activated by each trigger signal to prevent the occurrence of a coil on signal for a minimum predetermined time thereafter; and
   time delay means effective to delay activation of the clamp means by the trigger signal for a time sufficient to allow latching of the minimum burn timer, whereby a spark event is prevented from occurrence due to received RF signals during periods beginning just after each spark event and lasting until the following spark timing signal.

* * * * *

UNITED STATES PATENT AND TRADEMARK OFFICE
CERTIFICATE OF CORRECTION

PATENT NO. : 4,329,970
DATED : May 18, 1982
INVENTOR(S) : Kenneth D. Mowery

It is certified that error appears in the above—identified patent and that said Letters Patent is hereby corrected as shown below:

Column 4, line 30, "caused" should read -- causes --.

Column 8, line 19, "effectve" should read -- effective --.

Signed and Sealed this

*Thirty-first* Day of *August 1982*

[SEAL]

Attest:

Attesting Officer

GERALD J. MOSSINGHOFF

Commissioner of Patents and Trademarks